United States Patent
Bulovic et al.

(10) Patent No.: US 8,264,431 B2
(45) Date of Patent: Sep. 11, 2012

(54) LED ARRAY WITH PHOTODETECTOR

(75) Inventors: Vladimir Bulovic, Lexington, MA (US); Jonathan R. Tischler, Sharon, MA (US); Jennifer Yu, Chelmsford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 158 days.

(21) Appl. No.: 10/693,022

(22) Filed: Oct. 23, 2003

(65) Prior Publication Data
US 2005/0088380 A1  Apr. 28, 2005

(51) Int. Cl.
G09G 3/30  (2006.01)
(52) U.S. Cl. ............... 345/77; 345/78; 345/87; 345/207
(58) Field of Classification Search .................. 345/77; 257/80; 349/62
See application file for complete search history.

(56) References Cited

U.S. PATENT DOCUMENTS

| | | | |
|---|---|---|---|
| 6,069,676 A * | 5/2000 | Yuyama ...................... 349/62 |
| 6,320,325 B1 | 11/2001 | Cok et al. |
| 6,356,029 B1 * | 3/2002 | Hunter ....................... 315/169.1 |
| 6,392,617 B1 | 5/2002 | Gleason |
| 6,404,137 B1 | 6/2002 | Shodo |
| 6,424,326 B2 | 7/2002 | Yamazaki et al. |
| 6,501,091 B1 * | 12/2002 | Bawendi et al. .............. 257/14 |
| 7,026,597 B2 * | 4/2006 | Cok .............................. 345/77 |
| 7,027,014 B2 | 4/2006 | Sato et al. |
| 7,053,412 B2 * | 5/2006 | Hack et al. ..................... 257/79 |
| 7,064,733 B2 * | 6/2006 | Cok et al. ...................... 345/76 |
| 7,154,492 B2 * | 12/2006 | Henmi et al. .................. 345/77 |
| 7,385,572 B2 * | 6/2008 | Yu et al. ........................ 345/76 |
| 2002/0130326 A1 * | 9/2002 | Tamura et al. ................. 257/79 |
| 2003/0047736 A1 | 3/2003 | Hayashi et al. |
| 2004/0031965 A1 | 2/2004 | Forrest et al. |
| 2004/0031966 A1 | 2/2004 | Forrest et al. |
| 2004/0164939 A1 | 8/2004 | Johnson et al. |
| 2004/0263445 A1 | 12/2004 | Inukai et al. |
| 2005/0248516 A1 | 11/2005 | Li |

OTHER PUBLICATIONS

Jiangeng Xue, et al., "Organic Optical Bistable Switch", Applied Physics Letters, vol. 82, No. 1, pp. 136-138, Jan. 6, 2003.
Childs, M. et al., Advanced Poly-LED Displays, Philips Research Laboratories Redhill, Surrey, Philips Electronics Nederland B.V., *Proceedings of Electronic Imaging Science and Technology 2003*, SPIE vol. 5004, Apostolos T. Voutsas, Ed., Jan. 21-22, 2003, pp. 127-139.

* cited by examiner

*Primary Examiner* — Joe H Cheng
(74) *Attorney, Agent, or Firm* — Volpe and Koenig, P.C.

(57) ABSTRACT

Embodiments of the present invention provide for an array, and corresponding method of forming an array, that includes a plurality of light emitting devices. The light emitting devices are disposed over a substrate, and a photodetector detects light emitted through the substrate from the light emitting devices. Further, a substantially constant brightness may be maintained in a plurality of light emitting devices disposed over the upper surface of a substrate in an array. Light emitted through the substrate from each of the light emitting devices is measured, and the voltage level applied to each of the light emitting devices is varied to maintain a substantially constant brightness level of light emitted from the light emitting devices.

32 Claims, 8 Drawing Sheets

US 8,264,431 B2

LED ARRAY WITH PHOTODETECTOR

TECHNICAL FIELD

The present invention relates to an array of LEDs (light emitting diodes). More specifically, the present invention relates to such an array having LEDs and a photodetector.

BACKGROUND INFORMATION

Arrays may use LEDs within individual pixel elements. Such arrays may be used in flat panel displays. One problem with such displays is that the individual LEDs in the display may degrade at different rates due to different amount of use and other factors. When the difference in luminescence efficiency of LEDs within neighboring pixels becomes greater than a certain threshold, such as 5%, the pixel non-uniformity becomes observable, and the display is considered aged.

An aged display as described above may be no longer usable even though all pixels may still be brightly luminescent due to the observable non-uniformities in brightness between pixels. Such differential aging of pixels limits the life of a such a display to only a few months, making the displays not commercially viable.

Accordingly, techniques for correction of brightness levels of pixels to compensate for such differential aging in such displays have been developed. For example, the displays may be operated in a constant brightness mode instead of a constant current or voltage mode. The brightness level of each LED pixel may be monitored, and the current level may be adjusted to maintain a constant and uniform brightness for each LED pixel. It has been proposed to monitor the brightness level through the use of photodetectors, which are typically made from silicon technology.

Such photodetectors can be fabricated on a silicon substrate, with the LED layers formed over the photodetectors. This fabrication involves costly processing steps. For example, the metallic layer contacting the LEDs to the photodetector backplane must be transparent so that light can reach the photodetectors. This may reduce the forward quantum efficiency of the photodetectors by as much as 50%. Further, a distinct photodetector must be fabricated to support each LED, since the distance between the LED layers and the photodetectors will be submicron scale. Also, with such an approach, the photodetector circuitry will have to share the precious area on the substrate with active matrix device drivers that also occupy space on the silicon backplane.

SUMMARY OF THE INVENTION

Embodiments of the present invention provide for an array, and corresponding method of forming an array, that includes a plurality of light emitting devices. The light emitting devices are disposed over a substrate, and a photodetector detects light emitted through the substrate from the light emitting devices.

Embodiments of the present invention provide for a method for maintaining a substantially constant brightness in a plurality of light emitting devices disposed over the upper surface of a substrate in an array. The method measures light emitted through the substrate from each of the light emitting devices, and varying the voltage level applied to each of the light emitting devices to maintain a substantially constant brightness level of light emitted from the light emitting devices.

DETAILED DESCRIPTION

Embodiments of the present invention provide for an array, a method of forming an array, and a method for maintaining a substantially constant brightness in a plurality of light emitting devices disposed over the upper surface of a substrate in an array.

Figure 1:
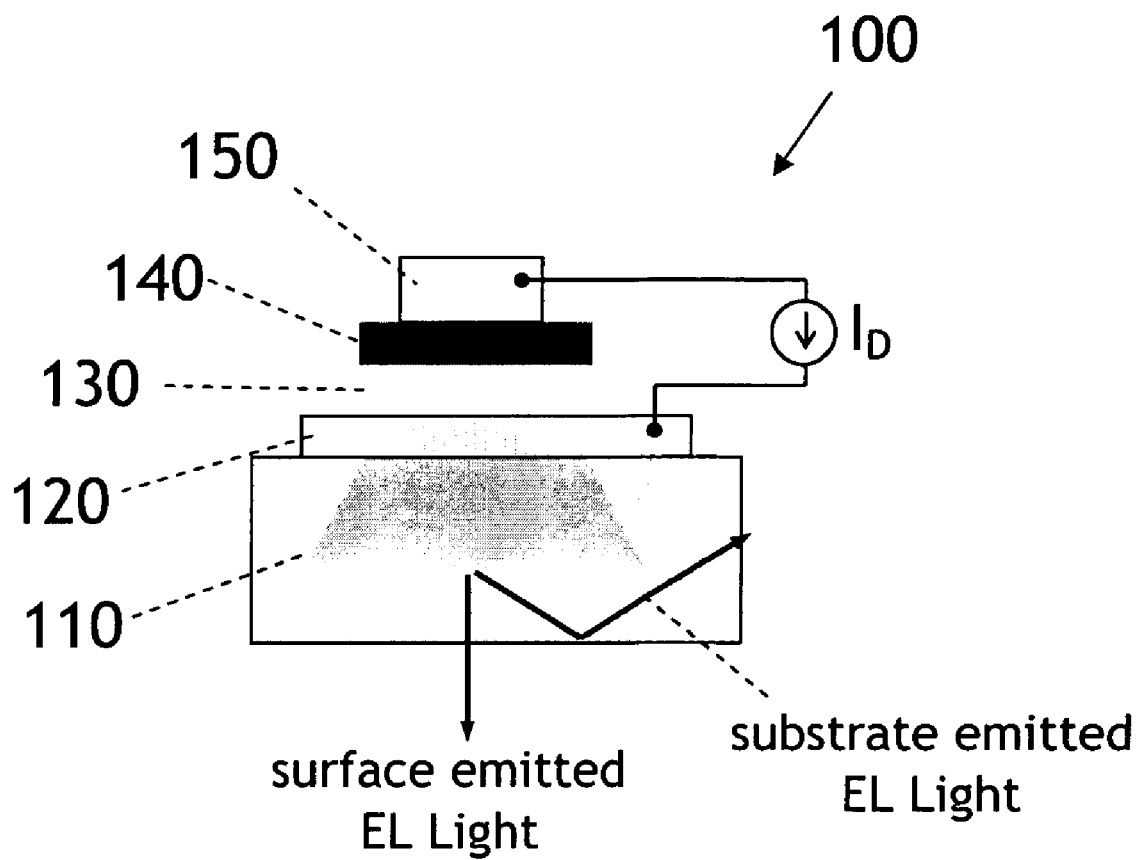
FIG. 1 is a diagram of an LED mounted on a substrate.

FIG. 1 illustrates an LED 100 formed on a transparent substrate 110. The substrate 110 may be a standard substrate or a flexible substrate. The LED may be any type of LED, such as an organic light emitting diode (OLED), a polymer light emitting diode (PLED), or a quantum dot light emitting diode (QDLED), for example. An OLED is shown in FIG. 1 as an example. The LED may include ITO (indium tin oxide) layer 120, metal layer 150, and sandwiched there between are HTL (hole transport layer) 130, and ETL (electron transport layer) 140. A voltage applied between the ITO layer 120 and the metal layer 150 causes current to flow there between, and the LED generates electroluminescent light, which is emitted through the transparent substrate 110. A portion of the light is waveguided in the substrate 110, and is emitted from edges of the substrate 110. The present invention measures the light emitted through the substrate, as further described below.

Figure 2:
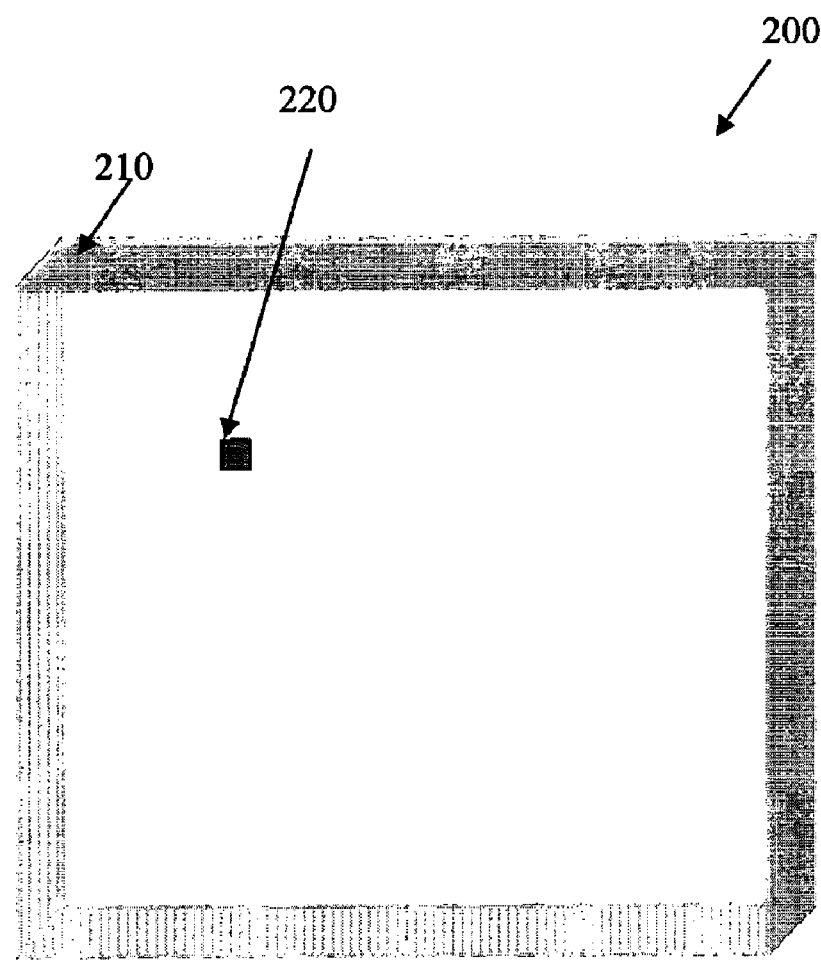
FIG. 2 is a diagram of an array of LEDs.

FIG. 2 illustrates an array 200 that may be used in accordance with embodiments of the present invention. The array 200 includes a plurality of LEDs, such as representative LED 220, that are formed over a substrate 210. The array may be used to form a display, where individual LEDs are selectively activated to form images. The arrays illustrated herein are passive matrix arrays, but the invention is equally applicable to active matrix arrays. The array 200 may include additional elements, as further described below.

Figure 3:
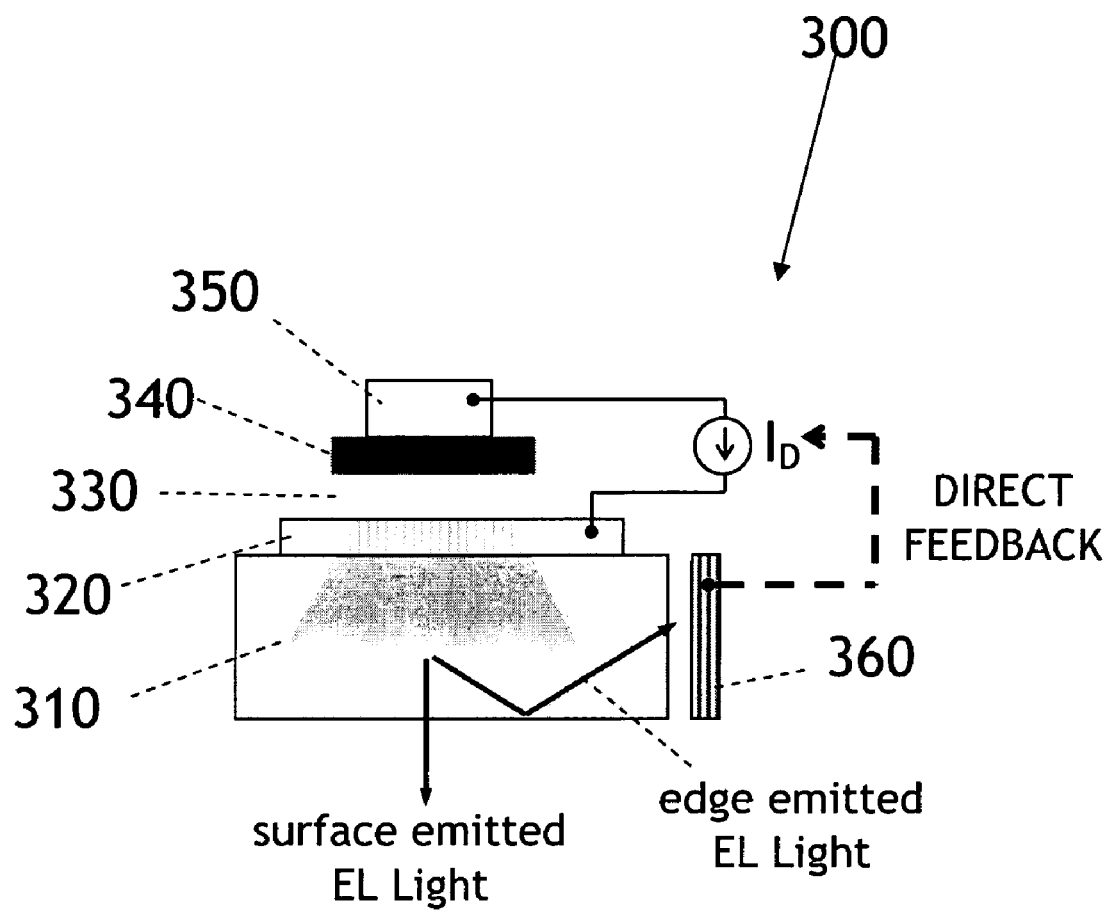
FIG. 3 is a diagram of an embodiment of the present invention.

FIG. 3 illustrates an LED 300 formed over a transparent substrate 310 in accordance with embodiments of the present invention. An OLED is shown as a type of LED that may be used. The LED includes HTL 330 and ETL 340 sandwiched between ITO layer 320 and metal layer 350. This embodiment uses photodetector 360 mounted on a side surface of the substrate 310, to measure light emitted through the substrate. The quantity of light measured is used to generate a compensation factor used to compensate for aging of the LED. As the LED ages and hence emits a lower quantity of light, the compensation factor is used to increase the voltage (and the current) applied to the LED to maintain a substantially constant brightness, as further explained below.

Figure 4:
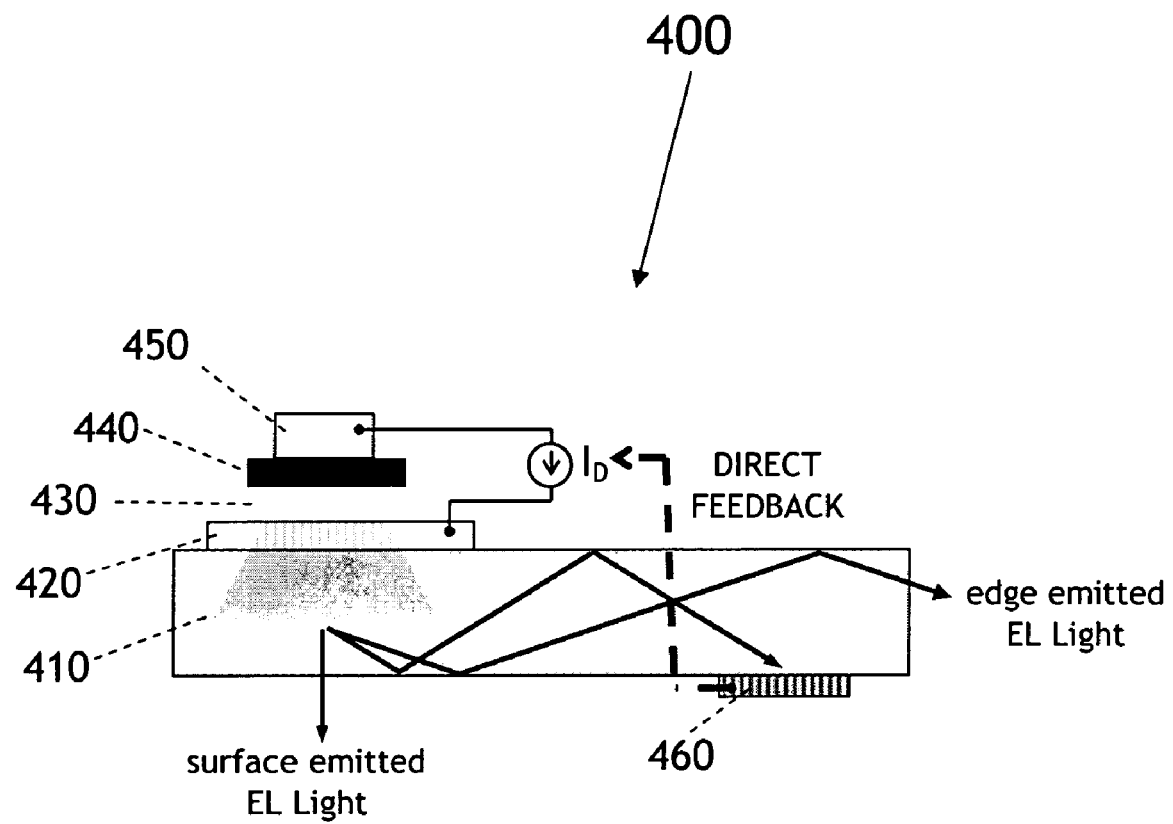
FIG. 4 is a diagram of an embodiment of the present invention.

FIG. 4 illustrates an LED 400 formed over a transparent substrate 410 in accordance with embodiments of the present invention. An OLED is shown as one type of LED that may be used. The LED includes HTL 430 and ETL 440 sandwiched between ITO layer 420 and metal layer 450. The LED includes HTL 430 and ETL 440 sandwiched between ITO layer 420 and metal layer 450. This embodiment uses photodetector 460 mounted on a lower surface of the substrate 410, to measure light emitted through the substrate. The photodetector 460 is not disposed directly below the LED where the surface emitted EL light emerges, but is instead disposed along an outer periphery edge of the substrate 410. Like the embodiment illustrated in FIG. 3, the photodetector 460 measures a quantity of light that is waveguided through the substrate 410. As an alternative to the embodiment illustrated in FIG. 4, the photodetector could be placed on an upper surface of the substrate 410, along the outer periphery edge of substrate 410.

Figure 5:
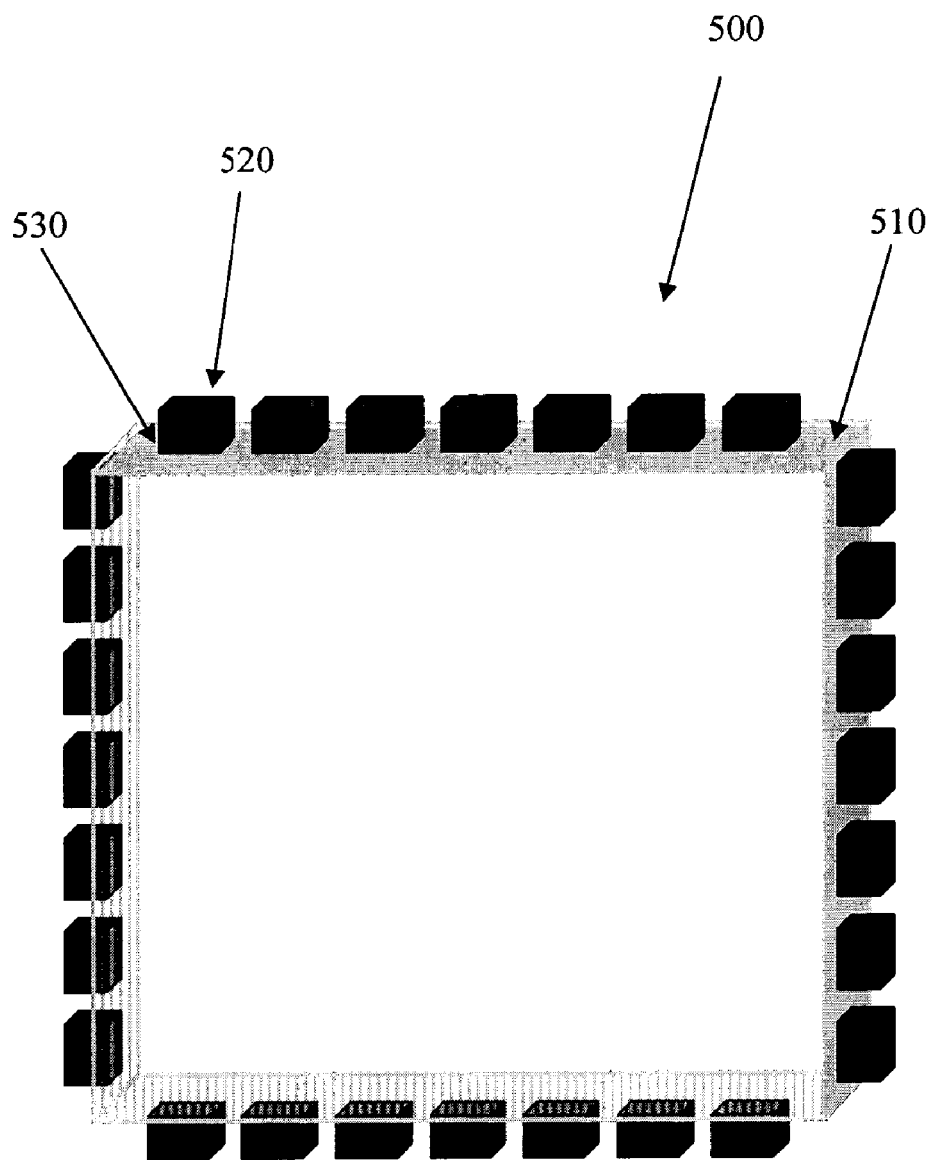
FIG. 5 is a diagram illustrating an array in accordance with an embodiment of the present invention.

FIG. 5 illustrates an array 500 in accordance with an embodiment of the present invention. The array 500 includes a substrate 510 having LEDs (not shown in this view) formed over the substrate. Any desired number of LEDs may be used in the array, and the number used may be set depending on desired resolution and cost, for example. The array also includes photodetectors 520 formed along edge surfaces 530 of the substrate 510. The edge surfaces may be substantially perpendicular to the upper surface of the substrate. The embodiment illustrated in FIG. 5 includes twenty eight photodetectors, with 7 along each of the four edge surfaces 530. More or less photodetectors 520 may be used. The more photodetectors 520 that are used, the quicker that the array may determine calibration factors for each LED in the array 500, as further explained below.

Figure 6:
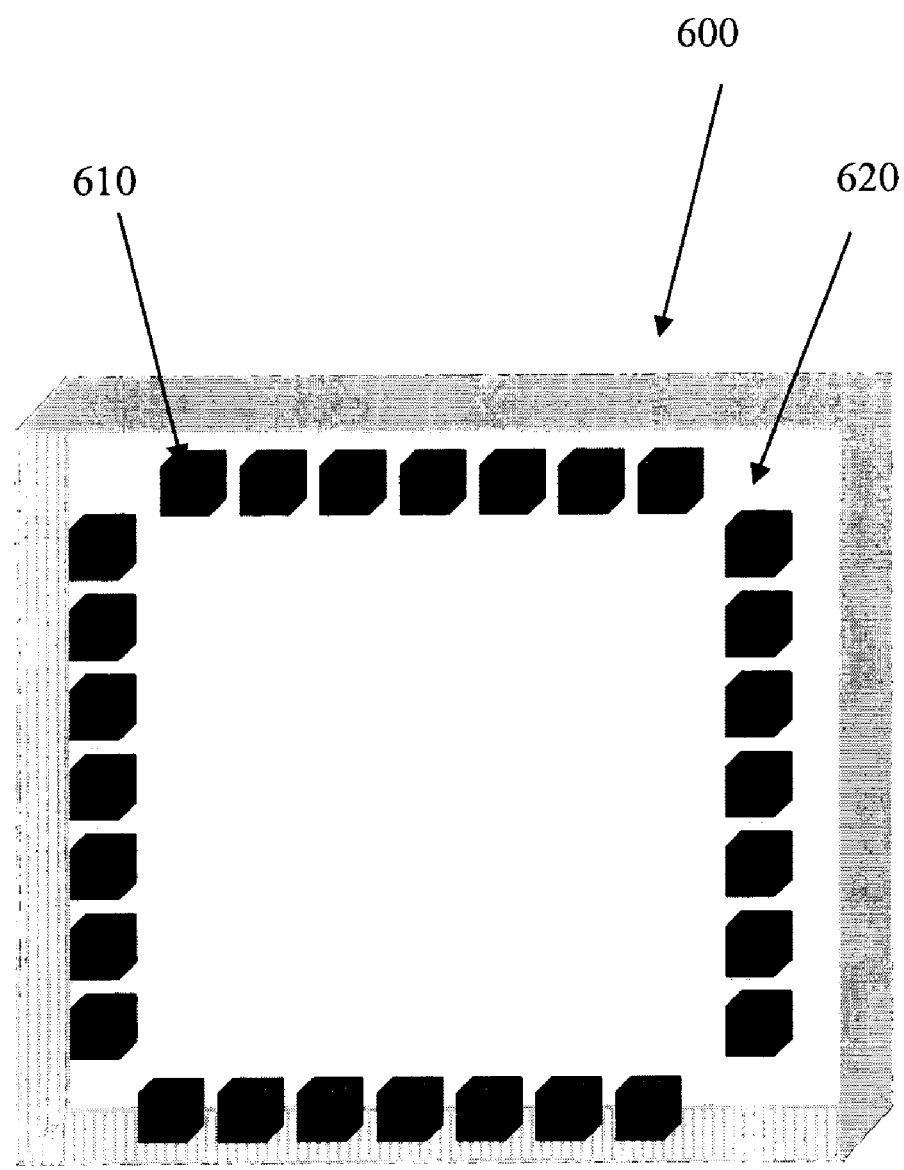
FIG. 6 is a diagram illustrating an array in accordance with an embodiment of the present invention.

FIG. 6 illustrates an embodiment of an array 600 in accordance with the present invention. In this embodiment, the photodetectors 610 are formed along an outer periphery edge 620 of the array 600. The outer periphery edge 620 will generally be a non-display area so as not to interfere with images that may be displayed by the LEDs. The embodiment shown in FIG. 6 illustrates twenty eight photodetectors 610, but again any number of photodetectors 610 may be used.

Figure 7:
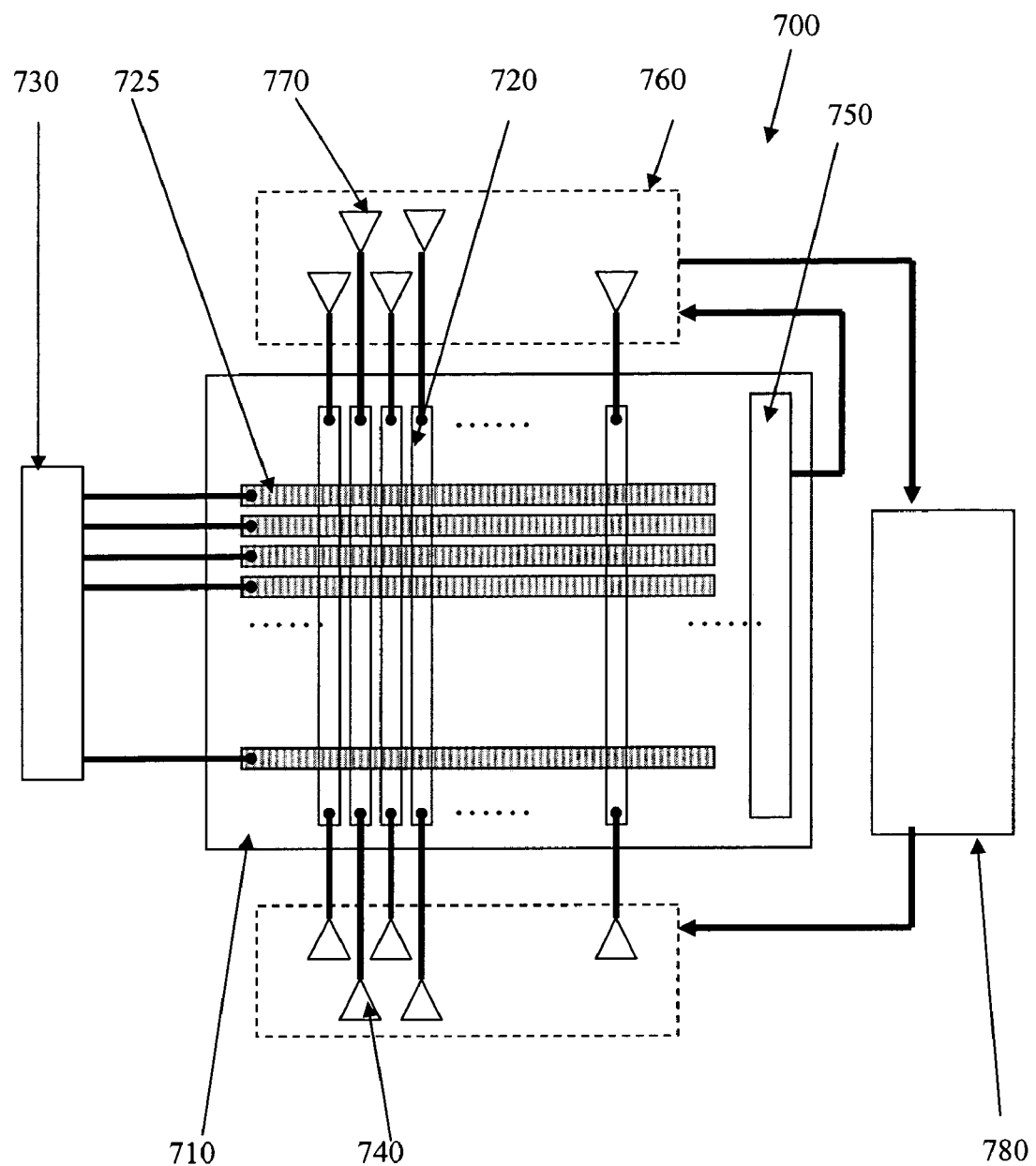
FIG. 7 is a diagram illustrating an array in accordance with an embodiment of the present invention.

FIG. 7 illustrates an array 700 in accordance with embodiments of the present invention. The array 700 includes a substrate 710 over which a plurality of LEDs are formed. As illustrated in previous figures, each of the LEDs is formed between ITO and metal layers acting as electrodes of the LEDs. Data/column electrodes 720 form the ITO layers of each LED, and scanning/row electrodes 725 form the metal layer of each LED. The HTL and ETL layers are disposed between and at the intersections of the data/column electrodes 720 and the scanning/row electrodes 725.

Multiplexer 730 is used to selectively address the scanning/row electrodes 725. Column drivers 740 are used to selectively drive the data/column electrodes 720. A voltage is applied across a particular LED in the array 700 when a scanning/row electrode and an intersecting data/column electrode are addressed at the same time, causing the corresponding LED to emit light. By selectively addressing the LEDs, images may be displayed.

The present invention compensates for aging effects of individual LEDs in the array by monitoring the light waveguided from individual pixels through the substrate 710 of the array and comparing the measured light to a reference value. If the measured light drops below the reference value, the voltage applied to the particular LED is increased to maintain the proper brightness level for the LED.

A photodetector or a plurality of photodetectors 750 are used to measure the light from individual LEDs. As explained above in conjunction with FIGS. 3-6, the photodetector or plurality of photodetectors may be placed in various positions on the substrate 710 where they may measure the light waveguided in the substrate, such as on an outer periphery of the upper or lower surface of the substrate 710, or on an edge surface or edge surfaces of the substrate 710. The photodetectors 750 feed the measured light to a feedback or compensation factor generator circuit 760, which will be further explained below in connection with FIG. 8.

The compensation factor generator 760 compares measured light values of individual LEDs to a reference value. If the measured value is different from the reference value, a compensation factor may be generated and stored in memory array 780, where it may be applied to individual LEDs by feedback to the column drivers 740.

When the array is initially calibrated, which may occur in a factory, an external camera may be used to measure brightness values for each LED. The current value needed to generate a reference brightness value, for example 100 photons, is recorded, and this may be done for each LED in the array. Additionally, for a particular photodetector, a measurement may be made as to how many of the photons are waveguided through the substrate to the photodetector. For example, if 1 milliamp of current is needed to generate 100 photons as measured by the camera, 2 photons may be measured by a particular photodetector.

When a calibration occurs at a later time, 1 milliamp of current is again applied to the particular LED as a reference, and the photodetector measures a brightness of the LED. If less than 2 photons is measured, the compensation factor can be used to increase the voltage (and current) applied to the LED, and then a further measurement may be made by the photodetector. The voltage may then be readjusted, and this process may continue until the proper brightness is measured at the photodetector, as further described below.

Figure 8:
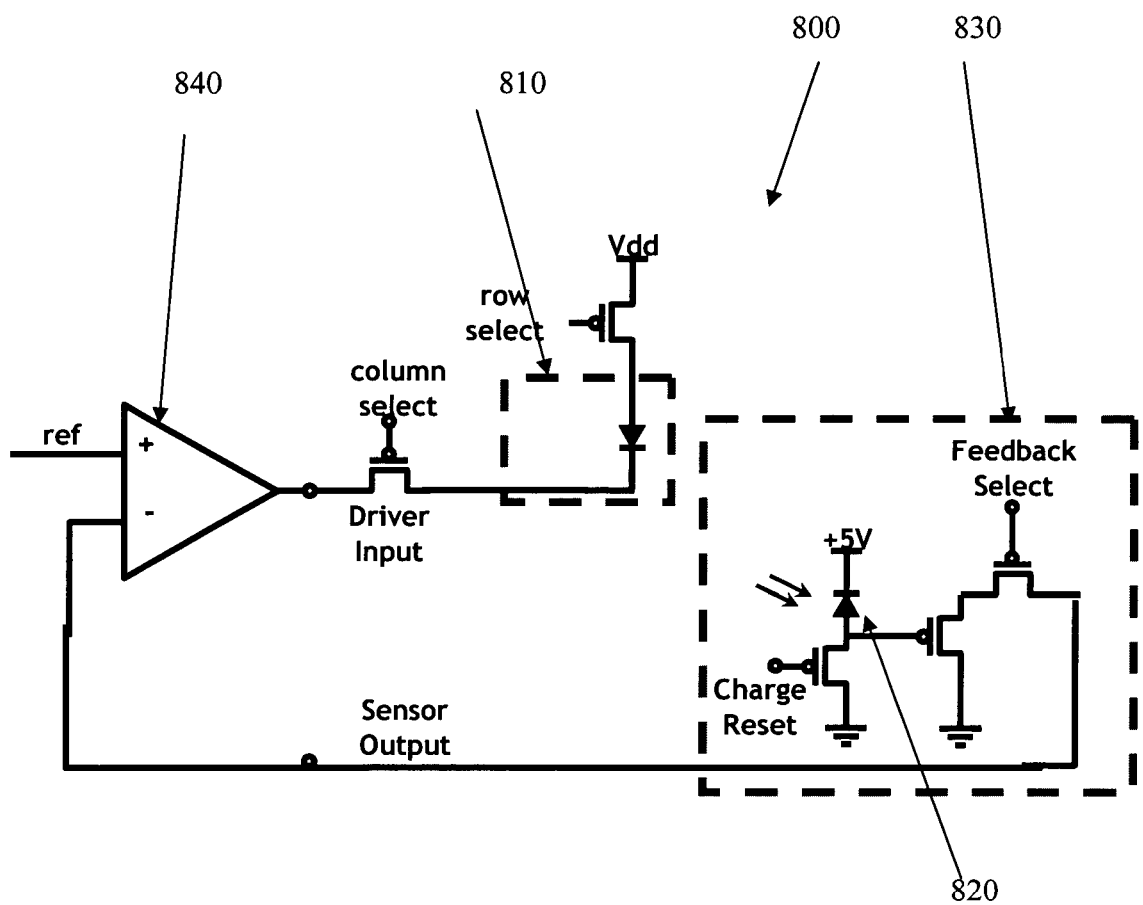
FIG. 8 is a diagram illustrating a compensation generator circuit in accordance with an embodiment of the present invention.

FIG. 8 illustrates a compensation factor generator circuit 800 and photodetector 830 that may be used in conjunction with the present invention. This is only one possible compensation factor generator circuit that may be used, and those of skill in the art would be able to develop alternative circuit that would work with the present invention.

The photodetector 830 includes a photodiode 820 that detects light emitted from the LED 810 through the substrate of the array. The measured light value may be fed to comparator 840, which may compare the measured value to a reference value. If the measured value is different from the reference value, the output of the comparator will change the optical output of the LED to compensate for the difference by applying a different voltage across the LED. This correction may be sufficient, but alternatively this compensation process may be repeated to achieve a more precise correction. The photodetector can read the light value of the LED again to readjust the output of the comparator and this process may continue until the input to the comparator from the photodetector matches the reference value. At this point, the compensation factor may be sent to the memory for storage and use when the array is operating.

The compensation factor may be applied to the corresponding LED upon selection of the particular column and row electrodes, so that the voltage applied across the electrodes is changed to compensate for the aging or other changes in performance of the LED, and to maintain a desired brightness of the LEDs.

When the array is used to generate the compensation factors, the array may activate a single LED, make a light measurement and calculate a compensation factor for the LED, and then repeat this process for each LED in the array until all of the compensation factors are calculated. Using this method, if the array has 1024×800 LEDs, 1024×800 separate measurements would be made.

As explained above, the present invention may use one photodetector or a plurality of photodetectors to measure light emitted and waiveguided through the substrate. The more photodetectors that are used, the faster the compensation factors for all LEDs in the array may be calculated. As an alternative to calculating compensation factors for one LED at a time as explained above, if twenty-eight photodetectors are used, then twenty-eight compensation factors for twenty-eight LEDs may be calculated simultaneously. In this way, the present invention would allow twenty-eight compensation factors to be calculated simultaneously taking approximately 10 microseconds for an LED array. For a standard display having 1024×800 pixel LEDs, all of the compensation factors could be calculated in approximately 0.3 seconds.

The present invention could be used in a display that calculates new compensation factors every time the display is turned on, at predetermined time intervals, or when selected by a user. A problem that could be encountered is that external light could interfere with the compensation process, but this should only be a factor if the external light is extremely bright. In such a case, the array could be covered or closed during the calibration.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. An array, comprising:
a plurality of light emitting devices disposed on a transparent substrate, the transparent substrate having an upper surface that contacts each light emitting device, a lower surface distal from the plurality of light emitting devices and a plurality of side surfaces, each of the side surfaces being substantially perpendicular to the upper surface, wherein each of the plurality of light emitting devices is individually addressed to display an image; and
at least one photodetector non-removably flush mounted, with a detector side facing the plurality of light emitting devices, on an external face of the lower surface of the transparent substrate for detecting a fraction of waveguided light emitted from the plurality of light emitting devices, wherein another fraction of waveguided light is edge emitted, wherein the fraction of waveguided light and the another fraction of waveguided light is directly observable.

2. The array of claim 1, further comprising at least one additional photodetector formed over outer periphery edges of the upper surface.

3. The array of claim 1, further comprising a feedback circuit that measures a brightness level for each of the plurality of light emitting devices, and varies a voltage applied to individual ones of the light emitting devices to maintain a brightness level of each of the light emitting devices at a substantially constant level.

4. The array of claim 3, wherein the feedback circuit includes a compensation factor generator for generating a compensation factor for each of the plurality of light emitting devices and a memory array for storing the compensation factor for each of the plurality of light emitting devices.

5. The array of claim 3, wherein the feedback circuit varies the voltage applied independently to the individual ones of the light emitting devices to maintain the brightness level of each of the light emitting devices at a substantially constant level.

6. The array of claim 1, wherein each of the plurality of light emitting devices is selectively activated to display the image.

7. A display comprising the array of claim 1.

8. A method for forming an array, comprising:
forming a plurality of light emitting devices disposed on a transparent substrate, said transparent substrate having an upper surface contacting each light emitting device, a lower surface distal from the light emitting device and at least one side surface substantially perpendicular to said upper surface of the transparent substrate, wherein each of the plurality of light emitting devices is individually addressed to display an image; and
non-removably flush mounting, with a detector side facing the plurality of light emitting devices, a photodetector at the lower surface of the transparent substrate for detecting a fraction of waveguided light emitted through the transparent substrate, wherein another fraction of waveguided light is edge emitted, wherein the fraction of waveguided light and the another fraction of waveguided light is directly observable.

9. The method of claim 8, further comprising forming at least another photodetector on the side surface of the transparent substrate.

10. The method of claim 8, wherein the photodetector includes a plurality of photodetectors.

11. The method of claim 10, further comprising forming at least one of the photodetectors on each of the side surfaces.

12. The method of claim 8, further comprising forming a feedback circuit that measures a brightness level for each of the plurality of light emitting devices, and varies a voltage applied to individual ones of the light emitting devices to maintain a brightness level of each of the light emitting devices at a substantially constant level.

13. The method of claim 12, further comprising forming the feedback circuit with a compensation factor generator for generating a compensation factor for each of the plurality of light emitting devices and a memory array for staring the compensation factor for each of the plurality of light emitting devices.

14. The method of claim 8, wherein each of the plurality of light emitting devices is selectively activated to display the image.

15. An array, comprising:
a plurality of light emitting devices formed on a surface of a transparent substrate, the transparent substrate having an upper surface that contacts each light emitting device, a lower surface distal from the light emitting device and a plurality of side surfaces,
wherein each of the plurality of light emitting devices is individually addressed to display an image; and
at least two photodetectors non-removably flush mounted, with a detector side facing the plurality of light emitting devices, on an external opposite surface of the transparent substrate for detecting a fraction of waveguided light emitted from the plurality of light emitting devices, wherein another fraction of waveguided light is edge emitted, wherein the fraction of waveguided light and the another fraction of waveguided light is directly observable.

16. The array of claim 15, further comprising at least one additional photodetector formed over outer periphery edges of the surface of the transparent substrate.

17. The array of claim 15, further comprising a feedback circuit that measures a brightness level for each of the plurality of light emitting devices, and varies a voltage applied to individual ones of the light emitting devices to maintain a brightness level of each of the light emitting devices at a substantially constant level.

18. The array of claim 17, wherein the feedback circuit includes a compensation factor generator for generating a compensation factor far each of the plurality of light emitting devices and a memory array for storing the compensation factor for each of the plurality of light emitting devices.

19. The array of claim 15, wherein each of the plurality of light emitting devices is selectively activated to display the image.

20. An array, comprising:
a plurality of light emitting devices disposed over a substrate having an upper surface that contacts each of the light emitting devices, a lower surface distal from the plurality of light emitting devices and a plurality of side surfaces,
wherein each of the plurality of light emitting devices is individually addressed to display an image; and
a photodetector that detects a fraction of waveguided light emitted through the substrate from the plurality of light emitting devices and wherein another fraction of waveguided light is emitted at the edge of the substrate, wherein the fraction of waveguided light and the another fraction of waveguided light is directly observable, wherein the photodetector is non-removably flush mounted, with a detector side facing the plurality of light emitting devices, on the lower surface and wherein at least one light emitting device comprises an OLED.

21. The array of claim 20 further comprising a feedback circuit that measures a brightness level for each of the plurality of light emitting devices, and varies a voltage applied to individual ones of the light emitting devices to maintain a brightness level of each of the light emitting devices at a substantially constant level.

22. The array of claim 21, wherein the feedback circuit includes a compensation factor generator for generating a compensation factor for each of the plurality of light emitting devices and a memory array for storing the compensation factor for each of the plurality of light emitting devices.

23. The array of claim 20, wherein each of the plurality of light emitting devices is selectively activated to display the image.

24. An array, comprising:
a plurality of fight emitting devices disposed over a substrate having an upper surface that contacts each of the light emitting devices, a lower surface distal from the plurality of light emitting devices and a plurality of side surfaces,
wherein each of the plurality of light emitting devices is individually addressed to display an image; and
a photodetector that detects a fraction of waveguided light emitted through the substrate from the plurality of light emitting devices and wherein another fraction of waveguided light is emitted at the edge of the substrate, wherein the fraction of waveguided light and the another fraction of waveguided light is directly observable, wherein the photodetector is non-removably flush mounted, with a detector side facing the plurality of light emitting devices, on the lower surface and wherein at least one light emitting device comprises a PLED.

25. The array of claim 24, further comprising a feedback circuit that measures a brightness level for each of the plurality of light emitting devices, and varies a voltage applied to individual ones of the light emitting devices to maintain a brightness level of each of the light emitting devices at a substantially constant level.

26. The array of claim 25, wherein the feedback circuit includes a compensation factor generator for generating a compensation factor for each of the plurality of light emitting devices and a memory array for storing the compensation factor for each of the plurality of light emitting devices.

27. The array of claim 24, wherein each of the plurality of light emitting devices is selectively activated to display the image.

28. An array, comprising:
a plurality of light emitting devices disposed over a substrate having an upper surface that contacts each of the light emitting devices, a lower surface distal from the plurality of light emitting devices and a plurality of side surfaces,
wherein each of the plurality of light emitting devices is individually addressed to display an image; and
a photodetector that detects a fraction of waveguided light emitted through the substrate from the plurality of light emitting devices and wherein another fraction of waveguided light is emitted at the edge of the substrate, wherein the fraction of waveguided light and the another fraction of waveguided light is directly observable wherein the photodetector is non-removably flush mounted, with a detector side facing the plurality of light emitting devices, on the lower surface and wherein at least one light emitting device comprises a QDLED.

29. The array of claim 28, further comprising a feedback circuit that measures a brightness level for each of the plurality of light emitting devices, and varies a voltage applied to individual ones of the light emitting devices to maintain a brightness level of each of the light emitting devices at a substantially constant level.

30. The array of claim 29, wherein the feedback circuit includes a compensation factor generator for generating a compensation factor for each of the plurality of light emitting devices and a memory array for storing the compensation factor fur each of the plurality of light emitting devices.

31. The array of claim 28, wherein each of the plurality of light emitting devices is selectively activated to display the image.

32. A display comprising the array of claim 28.

* * * * *